US012694729B2

(12) United States Patent　　　　(10) Patent No.:　US 12,694,729 B2
Kirk et al.　　　　　　　　　　　　(45) Date of Patent:　　　Jul. 28, 2026

(54) METHOD FOR ESTIMATING TIME PERIOD UNTIL EMPTY FOR MATERIAL IN A TANK OF VEHICLE

(71) Applicant: Deere & Company, Moline, IL (US)

(72) Inventors: Ryan Kirk, Urbandale, IA (US); Mayur Deo, Warsaw, IN (US); Palash Gupta, Urbandale, IA (US)

(73) Assignee: Deere & Company, Moline, IL (US)

( * ) Notice:　Subject to any disclaimer, the term of this patent is extended or adjusted under 35 U.S.C. 154(b) by 98 days.

(21) Appl. No.: 18/663,148

(22) Filed:　　May 14, 2024

(65)　　　　　　Prior Publication Data

US 2025/0078586 A1　　Mar. 6, 2025

Related U.S. Application Data

(60) Provisional application No. 63/580,088, filed on Sep. 1, 2023.

(51) Int. Cl.
　　*G07C 5/08*　　　　(2006.01)
　　*G06N 20/20*　　　(2019.01)
(52) U.S. Cl.
　　CPC ........... *G07C 5/0825* (2013.01); *G06N 20/20* (2019.01); *G07C 5/0808* (2013.01)
(58) Field of Classification Search
　　CPC .... G07C 5/0825; G07C 5/0808; G06N 20/20; G06N 20/00; G06N 5/01; G06Q 50/02; G06Q 10/0631; G06Q 10/04; A01B 79/005
See application file for complete search history.

(56)　　　　　　References Cited

U.S. PATENT DOCUMENTS

| | | | |
|---|---|---|---|
| 8,295,979 B2 | 10/2012 | Thacher et al. | |
| 10,912,249 B1 * | 2/2021 | Wilson | G05B 13/026 |
| 11,583,882 B2 * | 2/2023 | Harmon | B05B 12/12 |
| 11,684,004 B2 | 6/2023 | Murray et al. | |
| 11,756,341 B2 * | 9/2023 | Zeng | G06N 20/00 |
| | | | 701/123 |

(Continued)

FOREIGN PATENT DOCUMENTS

| | | | | |
|---|---|---|---|---|
| EP | 3483801 A1 * | 5/2019 | ......... | G01C 21/3469 |
| WO | WO-2016090427 A1 * | 6/2016 | ........... | G07C 5/0808 |

OTHER PUBLICATIONS

2021 IEEE 7th Forum on Internet of Things (Year: 2021).*

(Continued)

*Primary Examiner* — Fadey S. Jabr
*Assistant Examiner* — Ashutosh Pande
(74) *Attorney, Agent, or Firm* — Hanley, Flight & Zimmerman, LLC

(57)　　　　　　ABSTRACT

During an initialization period of a machine learning model, an electronic data processor is configured to estimate an initial depletion estimate of time period until empty for a material in the tank or container of a machine based on summing initial weighted inputs to the machine learning model in accordance with an initial equation set being applicable to the initialization period that is defined by an initial sub-operation period. After the initialization period of the machine learning model, an electronic data processor is configured to estimate a revised depletion time, where the revised depletion time comprises a time duration until empty or near empty.

17 Claims, 8 Drawing Sheets

38

(56)         References Cited

U.S. PATENT DOCUMENTS

| | | | |
|---|---|---|---|
| 2007/0112707 A1* | 5/2007 | Meng ..................... | G06N 3/08 |
| | | | 706/25 |
| 2012/0173087 A1 | 7/2012 | Hoffman et al. | |
| 2014/0257911 A1* | 9/2014 | Anderson ........ | G06Q 10/06315 |
| | | | 705/7.25 |
| 2015/0051825 A1* | 2/2015 | Saavedra .............. | B60K 35/28 |
| | | | 701/123 |
| 2017/0336239 A1* | 11/2017 | Collins ................ | G01F 23/804 |
| 2022/0391721 A1* | 12/2022 | Apte ................... | A01M 7/0089 |
| 2023/0243662 A1* | 8/2023 | Suplin ............... | G01C 21/3469 |
| | | | 701/123 |
| 2023/0243690 A1* | 8/2023 | Larsen .................. | G16Y 40/10 |
| | | | 702/55 |
| 2023/0376771 A1* | 11/2023 | Denil .................... | G06N 3/045 |

OTHER PUBLICATIONS

IEEE Instrumentation and Measurement Society (I2MTC) (Year: 2020).*
Ensemble methods in machine learning (Year: 2023).*
Initializing neural networks, deeplearning.ai (Year: 2019).*
Extended European Search Report and Written Opinion issued in European Patent Application No. 24190403.6 dated Jan. 14, 2025, in 12 pages.

\* cited by examiner

METHOD FOR ESTIMATING TIME PERIOD UNTIL EMPTY FOR MATERIAL IN A TANK OF VEHICLE

RELATED APPLICATION

This document (including the drawings) claims priority and the benefit of the filing date based on U.S. provisional application No. 63/580,088, filed Sep. 1, 2023, under 35 U.S.C. § 119(e), where the provisional application is hereby incorporated by reference herein.

FIELD

This invention relates to a time period until empty or near empty for a material in a tank or container of a vehicle, such as an off-road vehicle.

BACKGROUND

In some prior art, off-road vehicles have fuel tanks, or tanks for holding harvested agricultural material, or tanks for holding sprayable materials, where sprayable materials comprise pesticide, fertilizer, insecticide, herbicide, fungicide or similar materials in a solvent, such as water. Although the tank may have a level gauge or sensor, the level gauge or sensor may not provide an accurate estimate of when the tank will be empty or require refilling. Accordingly, there is need for a method for estimating time period until empty for material in the tank of a vehicle with improved accuracy, such that real-time estimates can be relied upon for planning and coordinating refilling and logistics of one or more vehicles at a field or worksite.

SUMMARY

In accordance with one embodiment, a method for estimating a time period (e.g., an estimated duration) until empty or near empty for a material in a tank or container of a machine or vehicle comprises collecting input data, where the input data comprises a consumption rate of the material, a tank capacity for the material, and an initial quantity of the material (e.g., in the tank) associated with operation of a corresponding machine. During an initialization period of a machine learning model, an electronic data processor is configured to estimate an initial depletion estimate (e.g., of time period until empty for a material in the tank or container of a machine) based on summing initial weighted inputs to the machine learning model in accordance with an initial equation set that is applicable to the initialization period (e.g., that is defined by an initial sub-operation period). After the initialization period of the machine learning model, an electronic data processor is configured to estimate a revised depletion time (e.g., revised depletion estimate), where the revised depletion time comprises a time duration until empty or near empty. Under some configurations, near empty is defined as less than a threshold minimum level for the material in the tank or container of a machine. The electronic data processor is configured to estimate the revised depletion time based on summing revised weighted inputs to the machine learning model in accordance with a revised equation set, where the revised weighted inputs are determined from the collected input data. An electronic display is configured to display the estimated depletion time to an end user of the machine, where the electronic display is in communication with an electronic data processor of the machine.

BRIEF DESCRIPTION OF THE DRAWINGS

Like reference numbers in any set of drawings in this document represents like elements, features or steps.

DETAILED DESCRIPTION

Figure 1A:
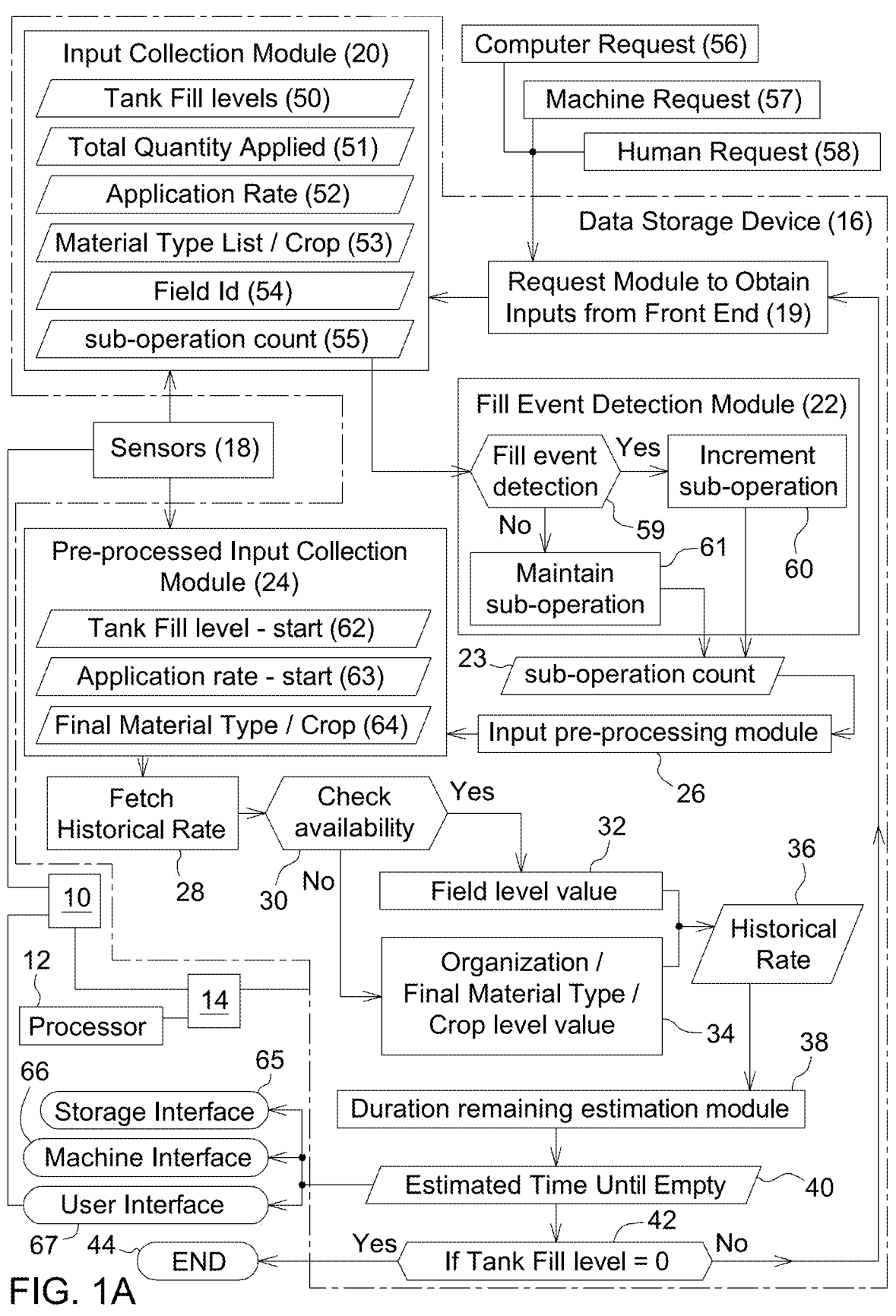
FIG. 1A is a block diagram of one example of an electronic data processing systems and various software modules and software instructions stored in the data storage device of the electronic data processing system to facilitate estimating a time period until empty for a material in a tank or container of a vehicle or machine.
Figure 1B:
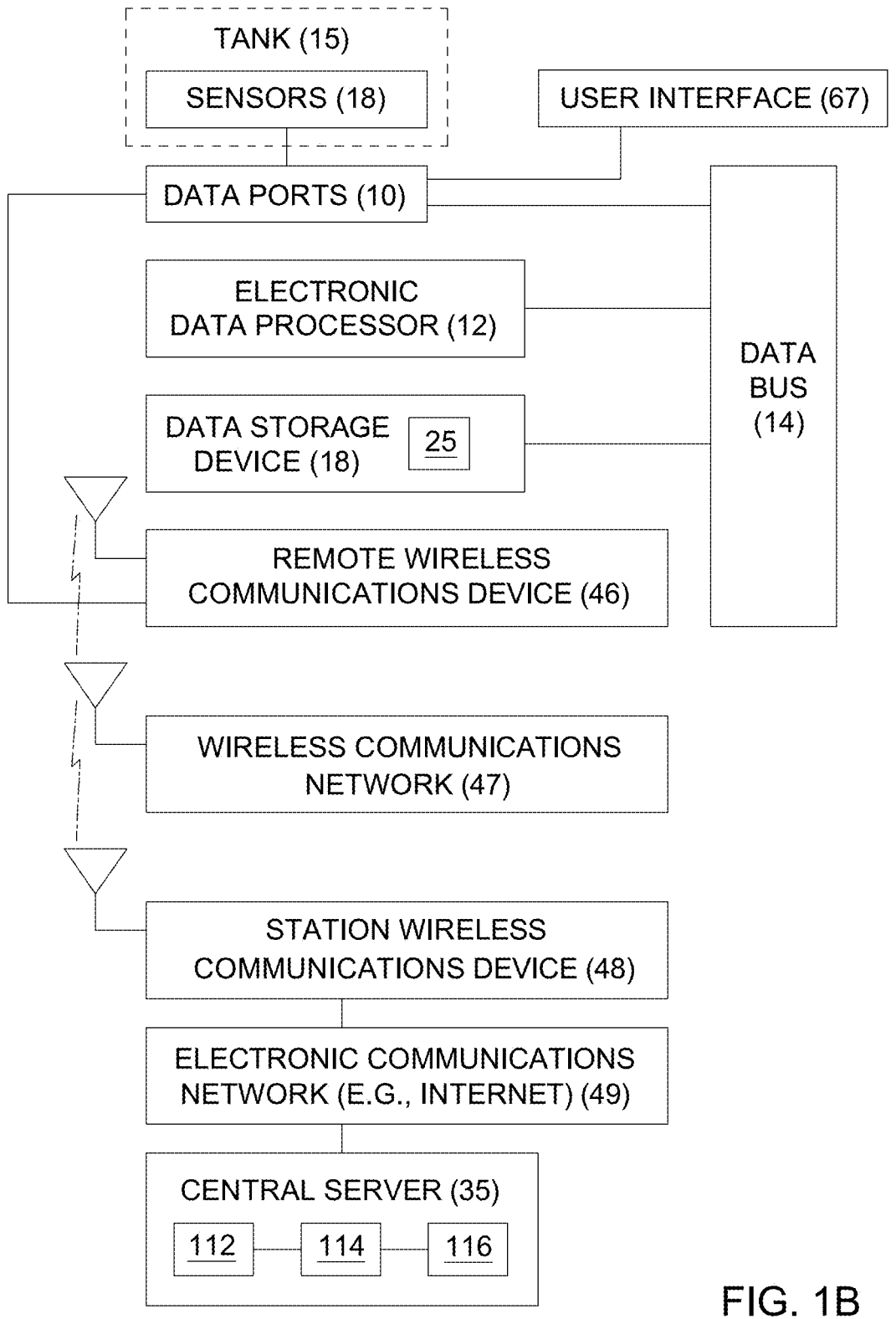
FIG. 1B is a block diagram of another example of an electronic data processing systems and various software modules and software instructions stored in the data storage device of the electronic data processing system to facilitate estimating a time period until empty for a material in a tank or container of a vehicle or machine.

The examples of FIG. 1A and FIG. 1B may be configured separately or cumulatively (e.g., as a unitary method or system). In FIG. 1A and FIG. 1B, a method or system for estimating a time period until empty or near empty for a material in a tank 15 or container of a machine or an off-road vehicle (e.g., sprayer, applicator, harvester or planter) comprises collecting input data that comprises a consumption rate of the material, a tank capacity (e.g., volumetric capacity) for the material, and an initial quantity of the material associated with operation of a corresponding machine based on sensor data from one or more sensors 18 in, above, about, or associated with the tank 15 or container. If the machine or off-road vehicle is a combine or a harvester, the tank may represent a tank 15 (e.g., harvested material storage tank) for storing a harvested material, such as a grain, maize, legumes, oilseed or other agricultural material. If the machine or off-road vehicle is a sprayer or applicator, the tank 15 may represent a tank for storing a crop input material, such as pesticide, insecticide, fertilizer, nutrients, water, herbicide, fungicide, where the crop input material can be in liquid (sprayable) form, pelletized form or granular form. If the machine or off-road vehicle is a planter or a tractor that moves a planter through the field, the tank 15 may comprise one or more tanks of seed to be planted, such as central seed tank or row unit seed tanks.

In an alternate embodiment, a tank may comprise a fuel tank that contains a fuel, such as ethanol, biodiesel fuel, gasoline, petroleum products, or another fuel.

Each tank 15 may have a known capacity or a maximum capacity; such as volumetric capacity of a material, a mass capacity of a material or fluidic size capacity of a material, where at the maximum capacity the tank is in a full state or filled state of material and generally contains the maximum material possible based on sensor data of one or more sensors 18 associated with the tank 15. Conversely, if the tank is at an empty state of the material, no material or merely traces of the material are present based on sensor data of one or more sensors 18 associated with the tank 15. However, in some embodiments, the empty state may represent a near empty state of the material in the tank 15 or a quasi-empty state in which there is a trace of material or a small reserve amount of material that is equal to or is less than some specified minimum volume, mass or fluidic size of material in the tank 15 based on the sensor data of one or more sensors 18.

As shown in FIG. 1B in this disclosure, a machine learning module comprises an artificial intelligence model that can be represented by or realized by one or more software modules 25 that are stored in the data storage device 16 or elsewhere (e.g., on the cloud, on a server 35, or associated with an electronic communications network 49 that is accessible via a remote wireless communications device 46 coupled to the data port 10, a wireless communications network 47, and a station wireless communications device 48). The software module 25 (e.g., machine learning module) can be executed by the electronic data processor (12, 112) on the off-road vehicle or at a central server 35 or on the cloud, any of which may have one or more processing cores (e.g., via an electronic data processor, 12, 112) and which may support parallel data processing to provide adequate data processing capacity and resources that could be required for implementing artificial intelligence (AI) models with multiple decision nodes with corresponding (secret) coefficients derived from training the AI models.

During an initialization period of one or more software modules 25 (e.g., a machine learning model), an electronic data processor (12, 112) is configured to estimate an initial depletion estimate of time period until empty for a material in the tank 15 or container of a machine based on summing initial weighted inputs to the machine learning model in accordance with sensor data of one or more sensors 18 and an initial equation set being applicable to the initialization period that is defined by an initial sub-operation period. After the initialization period of the software modules 25 (e.g., machine learning model), an electronic data processor (12, 112) is configured to estimate a revised depletion time, where the revised depletion time comprises a time duration until empty or near empty. Under some configurations, near empty is defined as less than or equal to a threshold minimum level for the material in the tank 15 or container of a machine. The electronic data processor (12, 112) is configured to estimate the revised depletion time based on summing revised weighted inputs to the machine learning model or software modules 25 in accordance with a revised equation set and the revised weighted inputs determined from the collected input data. An electronic display of the user interface 67 is configured to display, the estimated depletion time to an end user of the machine, where the electronic display is via in communication with an electronic data processor 12 of the machine.

In an alternate embodiment, a remote wireless communications device 46 is coupled to the one of the data ports 10 to support communication of data messages to central server 35, to the cloud, or to an electronic communications network 49 (e.g., Internet or websites). As shown in FIG. 1A, data messages (e.g., data packets) can be communicated between the remote wireless communications device 46 and the station wireless communications device 48 via a wireless communications network 47.

In accordance with the illustrative embodiment of FIG. 1, an electronic data processing system comprises an electronic data processor 12, a data storage device 16, and one or more data ports 10 that are coupled to a data bus 14. The electronic data processor 12, the data storage device 16 and one or more data ports 10 may communicate with each other via the data bus 14. The data storage device 16 is configured to store software, such as data, libraries, and software instructions in one or more software modules 25 that can be executed by the electronic data processor 12. The electronic data processor 12 comprises a microcontroller, a microprocessor, a system on a chip (SOC), a programmable logic array, a field programmable gate array (FPGA), a logic device, an arithmetic logic unit, a digital signal processor, an application specific integrated circuit (ASIC) or another device for processing or manipulating data.

The data storage device 16 comprises electronic memory, nonvolatile random-access memory, magnetic storage device, an optical storage device, or another device for storing, retrieving and managing data, files, data structures or data records. The data ports 10 may comprise an input/output port, a data transceiver, a wireline transceiver, a wireless transceiver, buffer memory. A user interface 67 may be coupled to a respective data port 10, where the user interface 67 comprises an electronic display, a keypad, a keyboard, an electronic pointing device (e.g., electronic mouse), or one or more switches.

One or more sensors 18 may be configured to communicate with one or more respective data ports 10, where an analog sensor may be coupled to an analog-to-digital (A/D) converter, which is, in turn, coupled to a corresponding data port 10. Further, the sensor or the A/D converter may be coupled to a filter or an integrator to smooth or average the sensed signals or sensor data readings over one or more measurement intervals. Under a first example, piezoelectric sensors 18 may be used to measure the mass or weight of material in a tank. Under a second example, a mass flow sensor 18 may comprise a strike plate that can move or compress a piezoelectric sensor based on or proportional to the amount of material (e.g., harvested material) inputted to a tank or exiting from the tank. Under a third example, an optical level sensor 18 that comprises one or more of the following: an optical transmitter, a light-emitting diode, a photocell and an optical receiver, to measure or indicate the amount of fuel or material in a respective tank of a given volume or capacity; an optical or laser transmitter is able to strike one or more target optical receivers in the absence of a material in the tank at the corresponding level (e.g., tank level of tank 15) of the target optical receiver. The target optical receiver comprises a photo-transistor, photocell, photo-diode, or the like, where the photo-transistor or photo-diode is switched on in response to the receipt of light or a laser beam incident (at or above a certain intensity or magnitude of signal strength and within a defined electro-magnetic frequency range/band or wavelength range) on the photo-transistor or photo-diode. Under a fourth example, a float gauge (as the sensor 18) measures or is indicative of the amount of fuel or material in a respective tank of a given volume or capacity; a float can be a float that can float near or on a surface of a liquid in the tank, where the float is attached to an arm or lever arm that can compress or apply tensile force to a piezoelectric sensor indicative of the height of the liquid in the container or tank.

One or more sensors 18 is configured to measure, collect or to provide input data related to a consumption rate of the material in the tank 15, a tank capacity for the material, and an initial quantity of the material, where the material quantity, material volume or material level can be measured with respect to the tank capacity, such as a percentage or fraction of total capacity for given tank 15 or converted to absolute units of volume or mass. If the material in the tank 15 is fuel for the engine or propulsion system of the machine or off-road vehicle, the consumption rate for fuel is configured to track a contribution to the consumption rate from management practices, such as retracing paths, reapplying material, correcting/ameliorating prior work tasks, stopping/deviating the machine to conduct field survey or inspections, leaving/returning to the field to take food, hydration, or bathroom breaks or switch operators of the machine, based on in-field observations of machine and implement operations that can lead to additional otherwise unpredictable consumption of material associated with operation of a corresponding machine. If the material in the tank is a sprayable material, the application rate 52 is correlated to or is proportional to a depletion or consumption rate. However, if the material in the tank 15 is harvested material that is collected during harvesting of the crop, the observed volume over time (e.g., time period in which the tank is filled until it reaches its volumetric capacity) may increase.

The consumption rate may be determined in accordance with various examples, which can be applied separately or cumulatively. Under a first example, the consumption rate represents a respective set of samples accumulated over a sampling interval, where the samples may represent an aggregate slope of a predicted decrease (or predicted increase) in volume of material in the tank per unit time. Under a second example, the consumption rate is based on a machine identifier and one or more of the following available hierarchical factors in hierarchical succession order as follows: field identifier 54 or work area identifier for the field or work area in which the machine operates, organization identifier for the organization that owns, leases or operates the machine, and material identifier of the material.

In one embodiment, the data storage device 16 is capable of storing, retrieving, reading. managing and accessing the software modules 25, such as software instructions, software instructions, libraries, configuration data or other data that is executable by the electronic data processor 12. For example, the data storage device 16 stores one or more of the following software modules 25: an input collection module 16, a request module 19, fill event detection module 22, pre-processing input collection module 24 input pre-processing module 26, fetch historical rate module 28, fill level monitor module.

In FIG. 1A and in FIG. 1B, the arrows or lines that connect modules indicate a virtual data path, a physical data path (e.g., via the data bus 14, 114), or both. For example, virtual data path may relate to software communications between software modules 25, such as system calls, data that is communicated via pipes, sockets or shared address space in memory of the data storage device (16, 116) or electronic data processor (12, 112), or its arithmetic logic unit. A physical data path may relate to data that is communicated over a wireless network (e.g., WiFi), a wireline network (e.g., Ethernet), one or more data bus (14, 114), a twisted pair cable, multiconductor cables, coaxial cable, fiber optic cable, conductive traces of circuit boards, and the like.

Within the input collection module 20, sensor data, of or from one or more sensors 18, is collected and stored, where the sensor data can be associated with a sampling interval, an initialization period, a post-initialization period, a sub-operation counter value, an elapsed time of a clock, or the like. The input collection module 20 may collect, store, retrieve or manage one or more of the following collected sensor data from one or more sensors 18: tank fill levels 50, total quantity applied 51 (e.g., in the sprayer context or applicator context), application rate 52, material type 53, material properties, material specifications, material list, material composition or constituents, crop type, crop variety; field identifier 54 or worksite identifier, sub-operation count 55 or measurement time interval, and elapsed time.

The input collection module 20 is configured to communicate (e.g., collected sensor data) with the fill event detection module 22, which detects if the tank is filled during any successive series of measurement intervals or during one or more sub-operation counts 55. If a fill event is detected in decision block 59, then in block 60 the electronic data processor 12 or fill event detection module 22 increments the sub-operation count (55, 23) of the sub-operation counter. However, if the fill event is not detected in decision block 59, then in block 61 the electronic data processor 12 or fill event detection module 22 maintains (e.g., does not increment and does not decrement) the sub-operation count (55, 23) of the sub-operation counter. As illustrated in FIG. 1, the fill event detection module 22 outputs a sub-operation count (55, 23) that is either incremented or unchanged; which is provided, in turn, to the input pre-processing module 26.

The input preprocessing module 26 or electronic data processor 12 is configured to determine or estimate one or more of the following: (a) a starting tank fill level 62 for a corresponding sub-operation count (55, 32), or (b) measurement time interval, a starting application rate 63 (e.g., for a sprayer or applicator context or planter context) for a corresponding sub-operation count (55, 2) or measurement time interval, and/or (c) a final material type 64 or crop type for a corresponding sub-operation count 55 or measurement time interval. The input pre-processing module 26 is configured to communicate with the fetch historical rate module 28.

In block 30, the fetch historical rate module 28 or electronic data processor 12 may query (e.g., check availability of) the data storage device 16 for historical records of any of the following historical rate data: sensor data, input data, field level data or worksite level data that was collected and stored by the input collection module 20 for a previous sub-operation count 55, or for a previous measurement time interval or for a successive series of previous measurement time intervals. If the (fetch) historical rate module 28, or check availability module 30, or electronic data processor 12 finds relevant historical rate data in the data storage device 16 or elsewhere (e.g., in cloud data storage that is accessible over a communications network 49 or wireless communications network 47), then in block 32 the historical rate data 36 (e.g., at the field level) is provided to the duration remaining estimation module 38. However, if the (fetch) historical rate module 28, check availability module 30, or electronic data processor 12 does not find relevant historical rate data 36 in the data storage device 16 or elsewhere at the field level (e.g., as field level values in block 32), then alternate data (via block 34) is retrieved (e.g., and sent as (aggregate) historical rate data 36), such as one or more of the following: (a) organizational identifier of the person or organization who owns, leases, or operates the machine or off-road vehicle. (b) final material type 53 if fuel, harvested agricultural material, or sprayable material, and/or (c) crop level value (e.g., economic scale of the organization and its crop production or other business). Collectively, the historical rate data 36 and the alternate data can be referred to as the aggregate historical rate data, which is provided to the duration remaining estimation module 38.

The duration remaining estimation module 38 or the electronic data processor 12 is configured to estimate the time until empty or near empty data 40 of the respective tank of a given corresponding capacity (e.g., volumetric capacity) based on the aggregate historical rate data, the first equation set or the second equation set. In one embodiment, the electronic data processor 12 or the duration remaining estimation module 38 is configured to provide or communicate the estimated time until empty data 40 (or near empty data) to a data storage interface 65, a machine interface 66 or a user interface 67. In block 42, the duration remaining estimation module 38 or the data processor 12 determines, estimates or measures if the tank 15 is empty or the fill level is zero. If the tank 15 is not empty or if the fill level is not zero, a timer optionally waits for a time interval prior to returning to the request module 19 to sense or detect any new inputs or sensor data from the user interface 67, or at a data port from a machine request 57 of the machine interface 66, computer request 56, or human request 58. At the duration remaining estimation module, together with the data processing system, the process steps outlined in FIG. 1 may continue as multiple iterations until the fill level is zero (e.g., or near zero) when the process ends in end block 44.

In one embodiment, the initialization period of the machine learning model coincides with an initial sub-operation period that represents a first fill and depletion cycle of the tank. The initial equation set may also be referred to as first time to empty algorithm (e.g., 501 in FIG. 5) that is associated with a set of first equations. Further, in one embodiment, the initialization period of the machine learning model coincides with second suboperation period through an Nth sub-operation period where N is greater than or equal to three. The subsequent equation set may be referred to as a second time to empty algorithm (e.g., 502 in FIG. 5) that is associated with a set of second equations.

The electronic data processor 12 is configured to determine the initial weighted inputs from any of the following: an observed initial depletion estimate for the respective current or live observation time that comprises a historical period; a historical estimate of the initial depletion time for the respective historical period; a material type 53 during the initialization period, and an initial consumption rate during the initialization period. For example, a historical estimate can terminate with the initial sub-operational period.

Under the first time to empty algorithm (e.g., 501 in FIG. 5), the first set of equations or initial equation set is configured to overweigh the initial depletion estimate (e.g., by squaring the first weight, weight1) such that the machine learning module is configured to determine based on the following collected input data: an observed initial depletion estimate for the respective current or live observation time that comprises a historical period and terminates with the sub-operational period; a historical estimate of the initial depletion time for the respective historical period, and a highest ranking available hierarchical factor in a hierarchical succession order. The highest ranking available hierarchical factor may be determined in accordance with various techniques, which may be applied separately or cumulative. Under a first technique, the highest ranking available hierarchical factor comprises an applied material type 53 and an initially applied material type 53; wherein the machine comprises a sprayer and the material comprises any of the following: a solution, mixture, compound, water, nutrients, a fungicide, pesticide, insecticide, herbicide, biocide, chemical or solvent. Under a second technique, the highest ranking available hierarchical factor comprises an applied material type 53 and an initially applied material type 53; wherein the machine comprises a planter and the material comprises any of the following: a seed, a plant, or both.

In one embodiment, the initial equation set or first set (e.g., 1.1 and 1.2 collectively) of equations comprises the following:

$$ETEt = \left(weight_1^2 * Initial\ estimate_t\right) + \left(weight_2 * Live\ sub\text{-}operational\ estimate_t\right) \qquad \text{Equation 1.1}$$

where:

ETEt is the estimated time period until empty or near empty of the material in the tank for the initialization period (e.g., sub-operational period zero);

$weight_1$ is the weight of a first cellular node of the machine learning model and where the $weight_1$ is selected by training the model (e.g., to minimize the negative log probabilities of the observed training data);

Initial estimate$_1$ is an observed initial depletion estimate for the respective current or live observation time that comprises a historical period and terminates with the sub-operational period;

$weight_2$ is the weight of a second cellular node of the machine learning model and where the weight1 is selected by training the model (e.g., to minimize the negative log probabilities of the observed training data); and Live sub-operational estimate$_t$ is an observed initial depletion estimate for the respective sub-operational period or initialization period.

Figure 5:
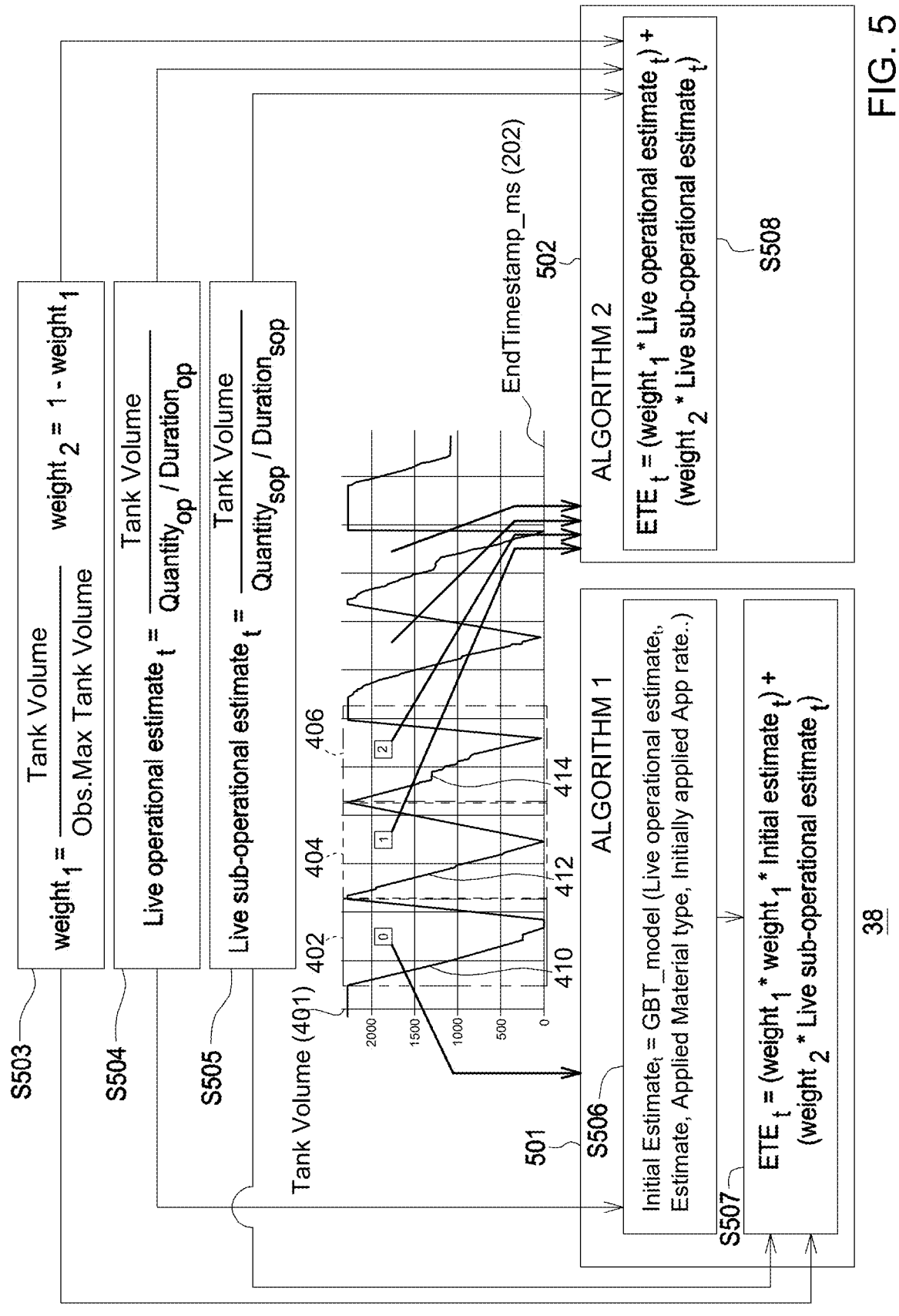
FIG. 5 illustrates an example of a first time-to-empty algorithm (e.g., first equation) that is used to estimate a time to empty for a first suboperation count or first interval and a second time to empty algorithm (e.g., second equation) that is used to estimate a time to empty for a second suboperation count or a second interval and a second time.

The above Equation 1.1 can be used or referenced in step S507 of FIG. 5, for example.

$$InitialEstimatet = MLmodel(\text{Live estimate}_t, \qquad \text{Equation 1.2}$$

$$HistoricalEstimate_t, Materialtype, InitialConsumptionrate,$$

$$OptionalModeledFactor),$$

where:

InitialEstimate$_t$ is the estimated time period until empty or near empty of the material in the tank for the respective initialization period or sub-operation period;

MLmodel comprises a gradient boosted tree decision network model, a linear regression model, a decision list network module, or a deep learning network;

Live estimatet is an observed initial depletion estimate for the respective current or live observation time that comprises a historical period (e.g., and terminates with the sub-operational period);

HistoricalEstimate$_t$ a historical estimate of the initial depletion time for the respective historical period;

Materialtype is a material type (e.g., 53) during the initialization period comprises fuel, diesel exhaust fluid, sprayable material, seeds, and an initial consumption rate during the initialization period; InitialConsumptionrate comprises an initial consumption rate for fuel material, an initial consumption rate (e.g., initial applied rate) for seeds, or an initial consumption rate (e.g., initial applied rate) for a sprayable (input) material or distributable (input) material; and OptionalModeledFactor is an optional factor such as a hierarchical factor (e.g., highest ranking hierarchical factor) that is available.

The above Equation 1.2 can be used or referenced in step S506 of FIG. 5, for example.

The initial equation set (e.g., first equation set of Equations 1.1 and 1.2, collectively) only applies to the initialization period that is defined a sub-operational period zero, whereas the revised equation set (e.g., second equation set in block 502 of FIG. 5 or S508) applies to the successive series of sub-operational periods from a first sub-operational period to an nth sub-operational period, where n is a positive integer value from 1 to a maximum value of N. The initial equation set (e.g., 501) is a preliminary estimate of the depletion time. The ETE$_t$ for the initial equation set represents the global ETE or estimated depletion time over session 0 (sub-operational period 0 or sub-operation count 0, when there is no estimate. The above weights are valid for at least session 0, after session zero the initial estimate is not used, unless the system is reinitialized or started over; if the system is reinitialized or started over as a warm start, as opposed to a cold start, the system may use the last available revised depletion time available for a recent sub-operation period instead of using the initial equation set.

For the revised equation set (e.g., second equation set of Equations 2.1 through 2.5, inclusive), Quantity$_{op}$/Duration$_{op}$ pertains to the entire (historical) series of sub-operation periods or sessions, and wherein the Quantity$_{sop}$/Duration$_{sop}$ pertains to a sub-operation of the current period, such as sub-operation count 55 1 through N, where N is the maximum or total sub-operation count (e.g., 23, 55). Quantity/Duration represents a depletion rate (e.g., application rate 52 for a sprayer or planter).

In one embodiment, a revised depletion time, a time period until empty, or time period until near empty is based on the following revised equation set (e.g., Equations 2.1, 2.2, 2.3, 2.4 and 2.5 collectively) after the initialization period (e.g., sub-operation period zero):

$$EtE_t = (\text{weight}_1 * \text{Live operational estimate}_t) + (\text{weight}_{2*} \qquad \text{Equation 2.1}$$

$$\text{Live sub-operational estimate}_t),$$

where:

ETE$_t$ is the estimated time period until empty or near empty of the material in the tank after any sub-operational period that follows the initialization period (e.g., sub-operational period zero);

weight$_1$ is the weight of a first cellular node of the machine learning model, where the weight$_1$ is selected by training the model (e.g., to minimize the negative log probabilities of the observed training data) or that is set in accordance with the following Equation 2.2:

$$\text{weight}_1 = \frac{\text{Tank Volume}}{\text{Observed Max Tank Volume}};$$

The above Equation 2.1 can be used or referenced in S508 of FIG. 5; the above Equation 2.2 can be used or referenced as S503, for example.

$$\text{Live operational estimate}_t = \frac{\text{Tank Volume}}{\text{Quantity}_{op}/\text{Duration}_{op}}, \qquad \text{Equation 2.3}$$

where:

the Tank Volume is the tank volume of respective machine containing the material;

Quantity$_{op}$ is the quantity of material in the tank based on a continuous series of sub-operational periods from a first sub-period to a current sub-operational period;

Duration$_{op}$ is the duration of sub-operational periods from a first sub-period to a current sub-operational period;

Live operational estimate$_t$ is an observed initial depletion estimate for the respective current or live observation time that comprises a continuous series of sub-operational periods from a first sub-period to a current sub-operational period or a continuous series of sub-operational periods from an initialization period to a current sub-operational period;

The above Equation 2.3 can be used or referenced in S504 of FIG. 5, for example.

$$\text{weight}_2 = 1 - \text{weight}_1, \qquad \text{Equation 2.4}$$

where:

weight$_2$ is the weight of a second cellular node of the machine learning model;

the weight$_2$ is selected by training the model (e.g., to minimize the negative log probabilities of the observed training data); and The above Equation 2.4 can be used or referenced in S503 of FIG. 5, for example.

$$\text{Live suboperational estimate}_t = \frac{\text{Tank Volume}}{\text{Quantity}_{sop}/\text{Duration}_{sop}} \qquad \text{Equation 2.5}$$

and where:

Quantity$_{sop}$ is the quantity of material in the tank for the current sub-operational period;

Duration$_{sop}$ is the duration of the current sub-operational period;

Live sub-operational estimate$_t$ is an observed initial depletion estimate for the respective sub-operational period.

The above Equation 2.5 can be used or referenced in S505 of FIG. 5, for example.

The user interface 67 or an electronic display, and/or software modules 25 (e.g., software application) may be configured to display the estimated depletion time or an estimated remaining coverage area prior to reaching the estimated depletion time, generating an data alert message when the observed depletion time is equal to or less than the minimum threshold depletion time. For example, the depletion time comprises an estimated time until a fuel tank (e.g., 15) is empty or near empty. Further in some embodiments, the electronic data processor 12, alone or via a command from a user interface 67, is configured to control or limit a maximum fuel consumption rate to extend the fuel at least to the estimated time until the fuel tank is empty or beyond such estimated time.

In some configurations, the electronic data processor 12, or one or more sensors 18 are configured to detect a fill event that adds additional material to any existing or remaining material in the tank 15 (e.g., wherein detecting a fill event comprises detecting an increase or continuous increase in observed volume of material in the tank for X number of sample sets and by a minimum threshold increase in volume). Further, the electronic data processor 12 is configured to increment a suboperation counter of suboperation periods to a next session in the time series of suboperation periods if the fill event is detected. During or after a fill event, the electronic data processor 12 is configured to estimate an amount or magnitude of the additional material added to the tank 15 (e.g., based on sensor data from one or more time intervals or sampling intervals). Further, the electronic data processor 12 is configured to determine an updated initial fill level of the tank for the next session based on the remaining material and the additional material.

The electronic data processor 12 is also configured to execute one or more of the following software instructions or software modules 25 that are stored in the data storage device 16: (a) providing the historical consumption rate as input data for processing by a machine learning model (e.g., realized by the software modules 25) after adjusting a fill level of the tank for a fill event; (b) determining a consumption rate that comprises a historical consumption rate based on a machine model, a machine identifier, an organization identifier who owns, leases or operates the machine, equipment hours, a field identifier 54 or worksite identifier, a date or season, an ambient temperature, a fuel type, a geographic region in which the machine is operated, and a crop type or operation task identifier; and (c) providing the historical consumption rate as input data for processing by the machine learning model.

The electronic data processor 12 may be configured to implement a machine learning model (e.g., of or associated with the software module 25) in accordance with various techniques which may be applied separately or cumulatively. Under a first technique, the machine learning model comprises a linear regression model, a decision list network, or a deep learning network, wherein the machine learning model. Under a second technique, the machine learning model comprises a network of cellular nodes, wherein an input layer of multiple cellular nodes is configured to communicate or to propagate an output of the estimated depletion time derived from each cellular node having an assigned weight.

In the collecting or providing of input data into the machine learning model, the consumption rate can be expressed in volume/unit time. Although the consumed quantity can be generally estimated as initial volume of material in the tank less elapsed time multiplied by the consumption rate, the confidence in the consumed quantity can be lower than expected when the above estimation is made without the benefit of the machine learning model that can take into account a consumption rate is configured to track a contribution/factor/enhancement to the consumption rate associated with management practices, such as retracing paths, reapplying material, correcting/ameliorating prior work tasks, stopping/deviating the machine to conduct field survey or inspections, leaving/returning to the field to take food, hydration, or bathroom breaks or switch operators of the machine, based on in-field observations of machine and implement operations that can lead to additional otherwise unpredictable consumption of material).

In one embodiment, the input data represents sensor data, such as sensor-provided data from one or more sensors 18, which are capable of providing a respective set of samples accumulated over a sampling interval (e.g., 30 seconds), where the samples may represent an aggregate slope of a predicted decrease in volume of material in the tank per unit time. Further the above respective set of samples may be simplified, reduced or averaged (e.g., filtered) into a mean, median, mode or other representative data point representing the respective set of samples accumulated over the above sampling interval. Near empty or empty can be defined as less than a threshold minimum level for the material in the tank or the container.

The initial equation set (e.g., first equation set of Equations 1.1 and 1.2, collectively) only applies to the initialization period that is defined a sub-operational period zero, whereas the revised equation set (e.g., second equation set) applies to the successive series of sub-operational periods from a first sub-operational period to an nth sub-operational period, where n is a positive integer value from 1 to a maximum value of N. The initial equation set is a preliminary estimate of the depletion time. The ETE$_t$ for the initial equation set represents the global ETE or estimated depletion time over session 0 (sub-operational period 0 or sub-operation count 0, when there is no estimate. The above weights are valid for at least session 0, after session zero the initial estimate is not used, unless the system is reinitialized or started over; if the system is reinitialized or started over as a warm start, as opposed to a cold start, the system may use the last available revised depletion time available for a recent sub-operation period instead of using the initial equation set.

For the revised equation set (e.g., second equation set of Equations 2.1 through 2.5, inclusive), Quantity$_{op}$/Duration$_{op}$ pertains to the entire (historical) series of sub-operation periods or sessions, and wherein the Quantity$_{sop}$/Duration$_{sop}$ pertains to a sub-operation of the current period, such as sub-operation count 55 1 through N, where N is the maximum or total sub-operation count 55. Quantity/Duration represents a depletion rate (e.g., application rate 52 for a sprayer or planter).

Figures 2A, 2B, 2C:
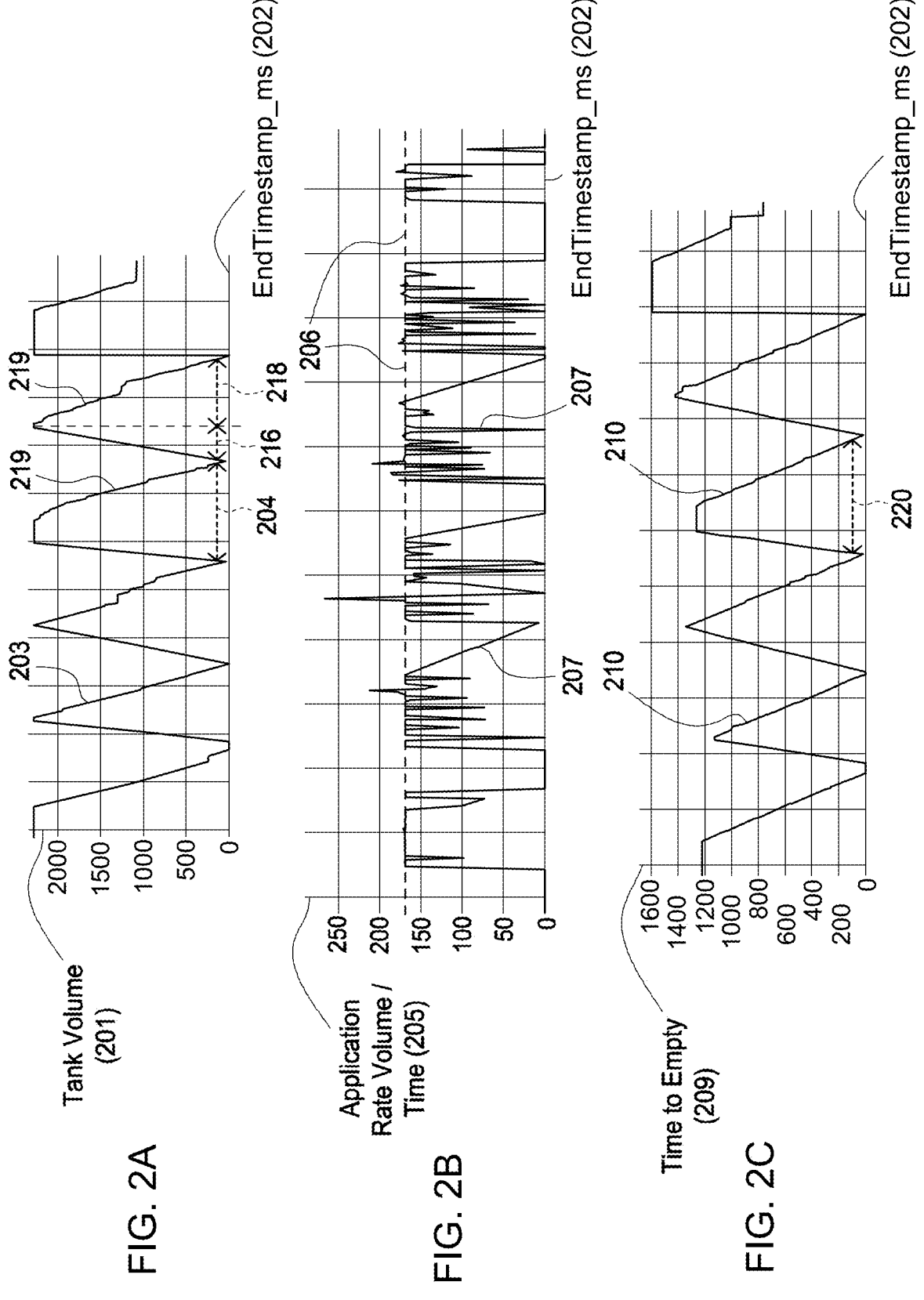
FIG. 2A is a magnitude of a volume indictor (e.g., signal) versus time that is representative of volume of material in a respective tank of a given capacity, where there is a series of successive cycles ranging from full to empty over time.
FIG. 2B is a magnitude of an application rate indicator (e.g., signal) versus time that is representative of application rate (e.g., or consumption rate) of material in a respective tank over time (e.g., for a sprayer vehicle).
FIG. 2C is a magnitude of an accurate reference indictor (e.g., ground truth signal) versus time that is representative of volume of material in a respective tank of a given capacity, where there is a series of successive cycles ranging from full to empty over time.

FIG. 2A is a magnitude of a signal 203 versus time 202 that is representative of volume of material in a respective tank of a given capacity (e.g., volumetric capacity), where there is a series of successive cycles ranging from full to empty over time. Each cycle (e.g., cycle 204) may be associated with a corresponding sub-operation count 55 or may represent a series of successive measurement intervals of the sensors 18 that measure or detect a quantity, mass, volume or level of tank with a corresponding capacity. In FIG. 2A, a present material volume (e.g., instantaneous or average) in the tank is indicated on the vertical axis (e.g., 201), whereas time is indicated on the horizontal axis (e.g., 202). The cycle 204 may comprise a refilling period 216 and a consumption period 218 (e.g., or depletion period). The consumption period 218 (e.g., depletion period) may represent a cycle portion of time from a full state of the tank to an empty or near empty state of the tank, where the depletion, consumption, or decrease of the volume of material can occur with a generally constant slope 219 over time, except slope deviations (e.g, curved portions of slope that conform to or can sometimes be piece-wise modeled as quadratic functions) or slope discontinuities that result from tracking a contribution/factor/enhancement to the consumption rate associated with management practices, such as retracing paths, reapplying material, correcting/ameliorating prior work tasks, stopping/deviating the machine to conduct field survey or inspections, leaving/returning to the field to take food, hydration, or bathroom breaks or switch operators of the machine, based on in-field observations of machine and implement operations that can lead to additional otherwise unpredictable consumption of material).

FIG. 2B is a magnitude of a signal 207 versus time 202 that is representative of a consumption rate or an application rate (e.g., 52) or volume of applied material from a respective tank over time (e.g., for a sprayer vehicle or applicator vehicle). In FIG. 2B, a presently applied material volume (e.g., instantaneous or average) versus time from the tank 15 is indicated on the vertical axis (e.g., 205), whereas time is indicated on the horizontal axis (e.g., 202). The applied material volume 207 over any measurement time interval or cumulative applied material volume 207 over any set of (successive) measurement time intervals can be subtracted from the present material volume (e.g., volume at initial time t) in a sprayer tank to estimate a next material volume (e.g., volume at later time after initial time, which can be expresses as time t+1, t+2 . . . t+N, where N is a positive integer greater than three) in the sprayer tank. Here, the target applied material is modeled as horizontal volume (e.g., constant or uniform volume, which is represented as a dashed line 206 in FIG. 2B) of target material to be applied versus time, although variable rate applications (e.g., 207) or other configurations can fall within the scope of the appended claims.

FIG. 2C is a magnitude of an accurate reference signal 210 (e.g., ground truth signal) versus time 202 that is representative of volume of material in a respective tank 15 of a given capacity (e.g., volumetric capacity), where there is a series of successive cycles 220 ranging from full to empty over time. In FIG. 2C, a present actual material volume (e.g., instantaneous or average that is an accurate reference measurement or ground truth) in the tank is indicated on the vertical axis (e.g., 209), whereas time is indicated on the horizontal axis (e.g., 202).

Figure 3:
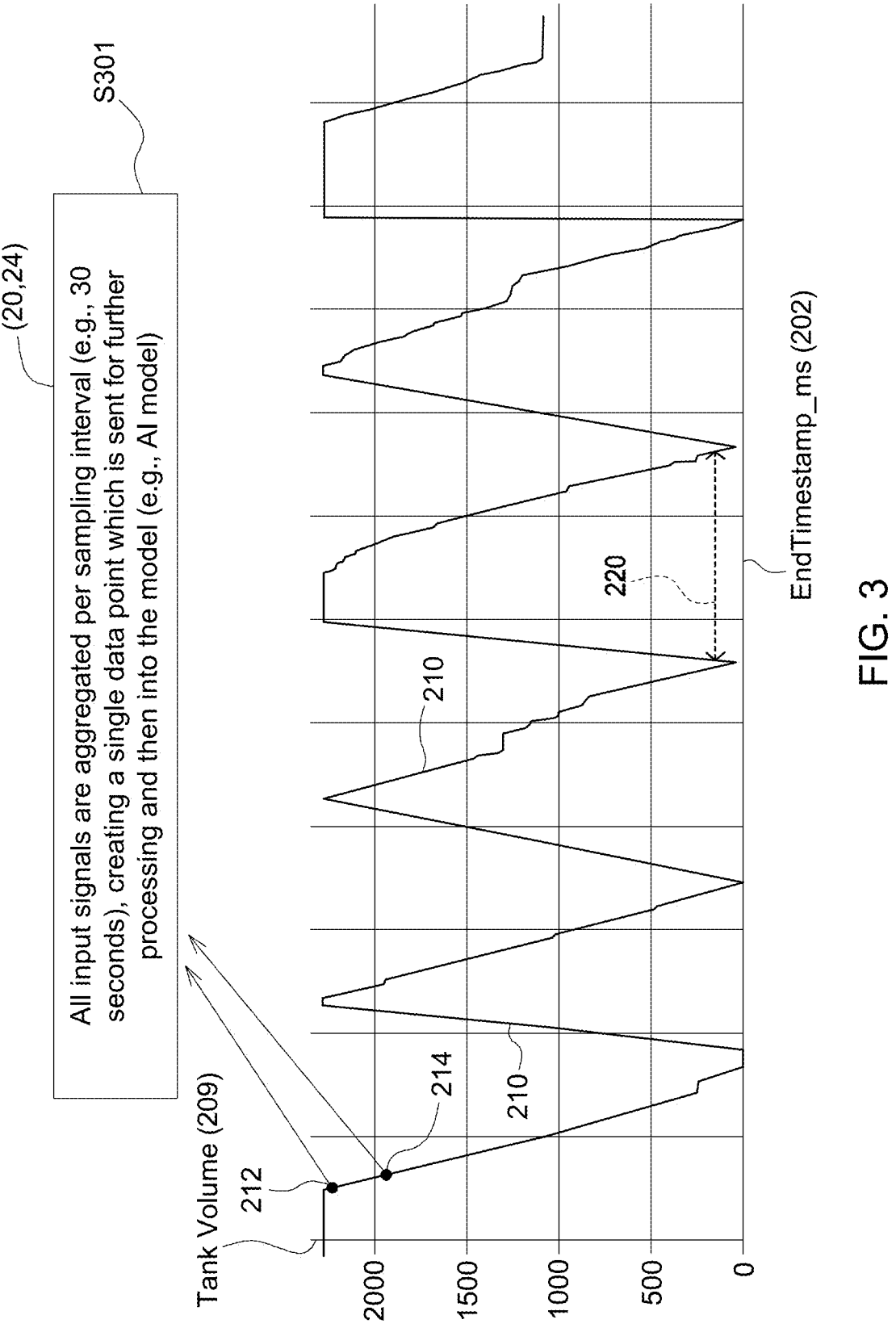
FIG. 3 is a magnitude of a tank volume indicator (e.g., expressed as a signal versus time) that is representative of volume of material in a respective tank of a given volumetric capacity, where there is a series of successive cycles ranging from full to empty over time and where any point on the signal represents an average or aggregation of samples over a measurement interval.

FIG. 3 is a magnitude of a signal 210 versus time 202 that is representative of volume of material in a respective tank of a given capacity (e.g., volumetric capacity), where there is a series of successive cycles 220 ranging from full to empty over time and where any point (212, 214) on the signal 210 represents an average or aggregation of samples over a measurement interval. In FIG. 3, a present material volume, as represented by signal 210 (e.g., instantaneous or average), in the tank 15 is indicated on the vertical axis 209, whereas time is indicated on the horizontal axis (e.g., 202). Here, each point (212, 214) on the material volume versus time plot or curve actually represents an aggregate measurement of multiple measurement intervals of the signal 210 over an aggregate time period or sampling interval (e.g., 30 seconds), such as a uniform time period or sampling interval. The averaging or aggregate measurement of the signal can be achieved by applying a (digital or analog) filter, such as a low-pass filter, or an integrator to a sensor output to smooth or average the sensed, measured or detected tank volume.

In step S301, FIG. 3 further discloses the following software instructions that are executed by the electronic data processor (12, 112) or by the fill event detection module 22: All input signals or sensor data from sensors 18 are aggregated per sampling interval (e.g., approximately 30 seconds) to create a single corresponding data point which the electronic data processor (12, 112) is configured to process, as described in conjunction with FIG. 1A and/or FIG. 1B, alone or in conjunction with a machine learning model of the software module(s) 25.

Figure 4:
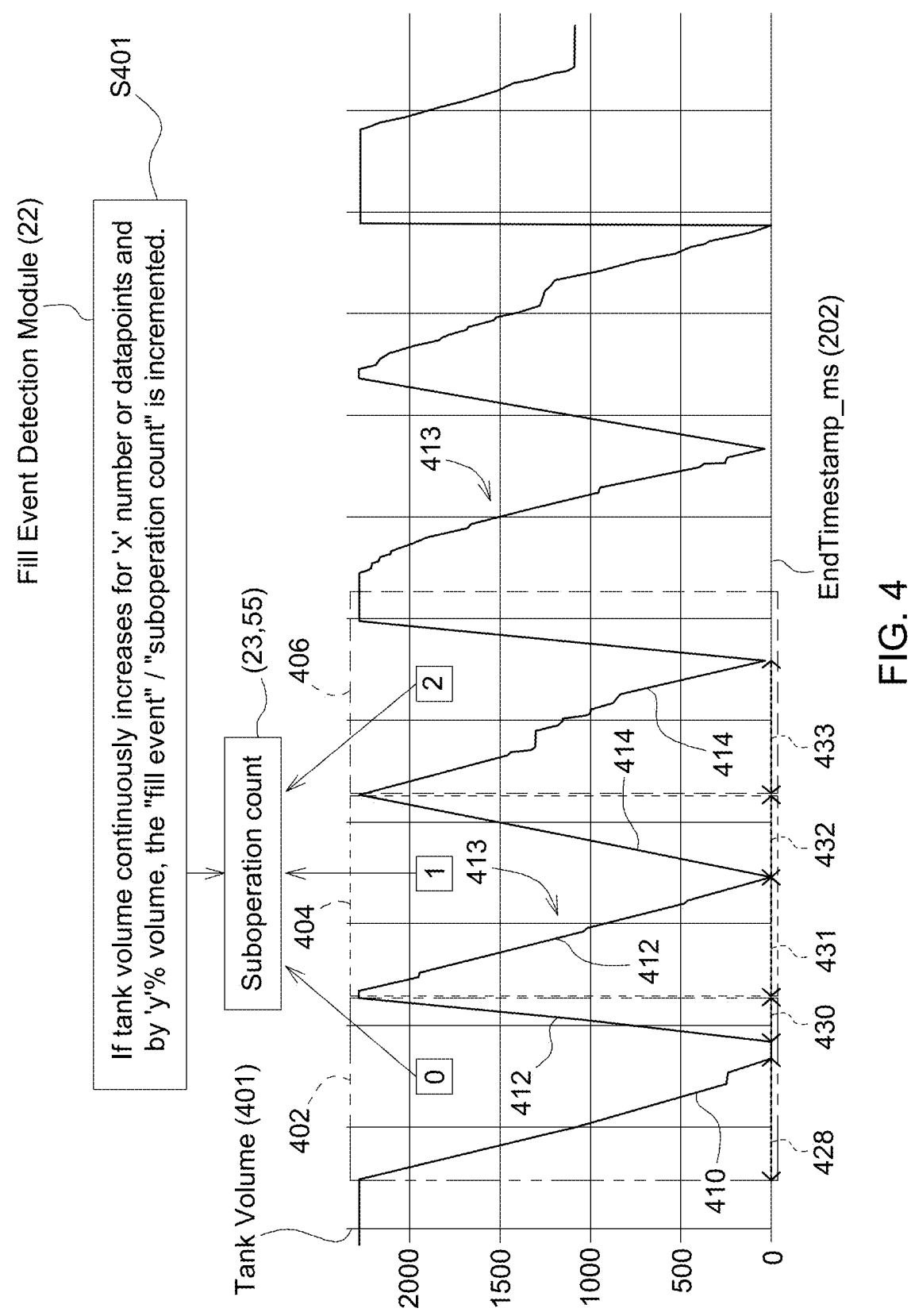
FIG. 4 is a magnitude of a tank volume indicator (e.g., signal) versus time that is representative of the volume of material in a tank of a given volume, where a fill event is detected and associated with a (suboperation) counter or fill even counter that is incremented.

FIG. 4 is a magnitude of signal 413 versus time 202 that is representative of the volume of material in a tank of a given volume or capacity, where a fill event (e.g., during fill period 430, 432) is detected and associated with a (suboperation) counter or fill event counter that is incremented. In FIG. 4, a present material volume 401 (e.g., instantaneous or average) in the tank 15 is indicated on the vertical axis, whereas time 202 is indicated on the horizontal axis. FIG. 4 illustrates a series of fill-and-depletion cycles or a depletion-and-fill cycle (410, 412, 414), where each cycle (412, 414) coincides with corresponding sub-operation counts (23, 55), where a depletion stage, consumption period, or depletion period (428, 431, 433) of material in the tank 15 is followed by refueling or refilling the tank 15 with the material during a refilling period (430, 432). Each fill-and-depletion cycle or depletion-and-fill cycle (410, 412, 414) may be associated with a different sub-operation count (23, 55) of the sub-operation counter, where the completion of each fill-and-depletion cycle (410, 412, 414) can result in increment the sub-operation counter. Here, a first cycle 410 has a sub-operation count (23,55) of zero; a second cycle 412 has a sub-operation count (23, 55) of one; a third cycle 414 has a sub-operation count (23, 55) of two. The sub-operation count or counter may also be related or to an elapsed time of a clock output, such as a start time of the cycle (e.g., depletion and fill cycle) and an end time of the cycle.

In step S401, FIG. 4 further discloses the following software instructions that are executed by the electronic data processor (12, 112) or by the fill event detection module 22: If the tank volume of the tank 15 continuously increases for a first (e.g., X) number of datapoints and by material volume (e.g., equal to or greater than Y % increase in volume in the tank, or another threshold volume or minimum critical volume for materiality), the electronic data processor (12, 112) or the fill event detection module 22 is configured to increment the fill event/suboperation count (55, 23).

FIG. 5 illustrates that a first time to empty algorithm (e.g., first set of equations 501 which refers to step S506 and step S507 in conjunction with preparatory steps S503, S504 and S505) is used to estimate a time to empty for a first suboperation count or first interval and a second time to empty algorithm (e.g., second set of equations 502 which refers to S508 in conjunction with preparatory steps S503, S504 and S505) is used to estimate a time to empty for a second suboperation count or a second interval and a second time. Like reference numbers in FIG. 4 and FIG. 5 indicate like methods, processes, elements, or features.

If the electronic data processor (12, 112) or fill event detection module (22) determines that the suboperation count (23, 55) is equal to or less than a threshold (e.g., equal to 0 or an initial suboperation count) for a corresponding time 202 (e.g., end time stamp), then the method of FIG. 5 applies the first set of equations 501. As illustrated by the arrow in FIG. 5, if initial suboperation count (23, 55) is zero in cycle 402, the process or method is directed toward the first set of equations 501. However, if the electronic data processor (12, 112) or fill event detection module (22) determines that the suboperation count (23, 55) is greater than a threshold (e.g., greater than 0 or an initial suboperation count) for a corresponding time 202 (e.g., end time stamp), then the method of FIG. 5 applies the second set of equations 502. As illustrated by the arrows in FIG. 5, if suboperation count is one, two or greater in cycles (404, 406), the process or method is directed toward the first set of equations 502.

In FIG. 5, preparatory steps S503, S504, and S505 may be executed in any order or simultaneously to prepare for the first set of equations 501 or the second set of equations 502.

In step S503, the electronic data processor (12,112) is configured to determine or estimate the $weight_1$ that is the weight of a first cellular node of the machine learning model. In one embodiment, the $weight_1$ is selected by training the model (e.g., to minimize the negative log probabilities of the observed training data) or $weight_1$ is set in accordance with the following Equation 2.2:

$$weight_1 = \frac{\text{Tank Volume}}{\text{Observed Max Tank Volume}};$$

where:

Tank Volume is the tank volume of material in the tank of respective machine that contains the material; and Observed Max Tank Volume is the full amount or maximum observed material in the tank of the respective machine that contains the material.

Further, in step S503 the electronic data processor (12, 112) is configured to determine or estimate $weight_2$ in accordance with Equation 2.4 as follows:

$$weight_2 = 1 - weight_1,$$

where:

$weight_2$ is the weight of a second cellular node of the machine learning model;

the $weight_2$ is selected by training the model (e.g., to minimize the negative log probabilities of the observed training data); and $weight_1$ is set or defined in accordance with the Equation 2.2.

In step S504, the electronic data processor (12,112) is configured to determine or estimate a Live operational estimate$_t$, which is an observed initial depletion estimate for the respective current or live observation time, in accordance with Equation 2.3.

In step S505, the electronic data processor (12,112) is configured to determine or estimate a Live sub-operational estimate$_t$ in accordance with Equation 2.5 as follows:

$$\text{Live suboperational estimate}_t = \frac{\text{Tank Volume}}{\text{Quantity}_{sop}/\text{Duration}_{sop}}$$

and where:

Tank Volume is the tank volume of material in the tank of respective machine that contains the material;

$\text{Quantity}_{sop}$ is the quantity of material in the tank for the current sub-operational period;

$\text{Duration}_{sop}$ is the duration of the current sub-operational period;

Live sub-operational estimate$_t$ is an observed initial depletion estimate for the respective sub-operational period.

In step S506, the electronic data processor (12, 112) is configured to determine or estimate InitialEstimate, based on following Equation 1.2:

$$InitialEstimatet = MLmodel(\text{Live estimate}_t, HistoricalEstimate_t,$$

$$Materialtype, InitialConsumptionrate, OptionalModeledFactor),$$

where:

InitialEstimate$_t$ is the estimated time period until empty or near empty of the material in the tank for the respective initialization period or sub-operation period;

MLmodel comprises a gradient boosted tree decision network model, a linear regression model, a decision list network module, or a deep learning network;

Live estimatet is an observed initial depletion estimate for the respective current or live observation time that comprises a historical period (e.g., and terminates with the sub-operational period);

HistoricalEstimate$_t$ a historical estimate of the initial depletion time for the respective historical period;

Materialtype is a material type (e.g., 53) during the initialization period comprises fuel, diesel exhaust fluid, sprayable material, seeds, and an initial consumption rate during the initialization period; InitialConsumptionrate comprises an initial consumption rate for fuel material, an initial consumption rate (e.g., initial applied rate) for seeds, or an initial consumption rate (e.g., initial applied rate) for a sprayable (input) material or distributable (input) material; and OptionalModeledFactor is an optional factor such as a hierarchical factor (e.g., highest ranking hierarchical factor) that is available In step S507, the electronic data processor (12, 112) is configured to determine or estimate the estimated time period until empty or near empty (e.g., ETEt) of the material in the tank for the initialization period (e.g., sub-operational period zero) based on following Equation 1.1:

$$ETEt = (weight_1^2 * \text{Initial estimate}_t) + (weight_2 * \text{Live sub-operational}$$

$$\text{estimate}_t),$$

where:

ETEt is the estimated time period until empty or near empty of the material in the tank for the initialization period (e.g., sub-operational period zero);

$weight_1$ is the weight of a first cellular node of the machine learning model and where the $weight_1$ is selected by training the model (e.g., to minimize the negative log probabilities of the observed training data);

Initial estimate$_t$ is an observed initial depletion estimate for the respective current or live observation time that comprises a historical period and terminates with the sub-operational period;

weight$_2$ is the weight of a second cellular node of the machine learning model and where the weight$_1$ is selected by training the model (e.g., to minimize the negative log probabilities of the observed training data); and Live sub-operational estimate$_t$ is an observed initial depletion estimate for the respective sub-operational period or initialization period.

In step S508, the electronic data processor (12, 112) is configured to determine or estimate the estimated time period until empty or near empty (e.g., ETEt) of the material in the tank for the post initialization period (e.g., sub-operational period greater than zero) based on following Equation 2.1:

$$EtE_t = (\text{weight}_1 * \text{Live operational estimate}_t) + (\text{weight}_2 * \text{Live sub-operational estimate}_t),$$

where:

ETE$_t$ is the estimated time period until empty or near empty of the material in the tank after any sub-operational period that follows the initialization period (e.g., sub-operational period zero);

weight$_1$ is the weight of a first cellular node of the machine learning model, where the weight$_1$ is selected by training the model (e.g., to minimize the negative log probabilities of the observed training data) or that is set in accordance with the following Equation 2.2.

Figure 6:
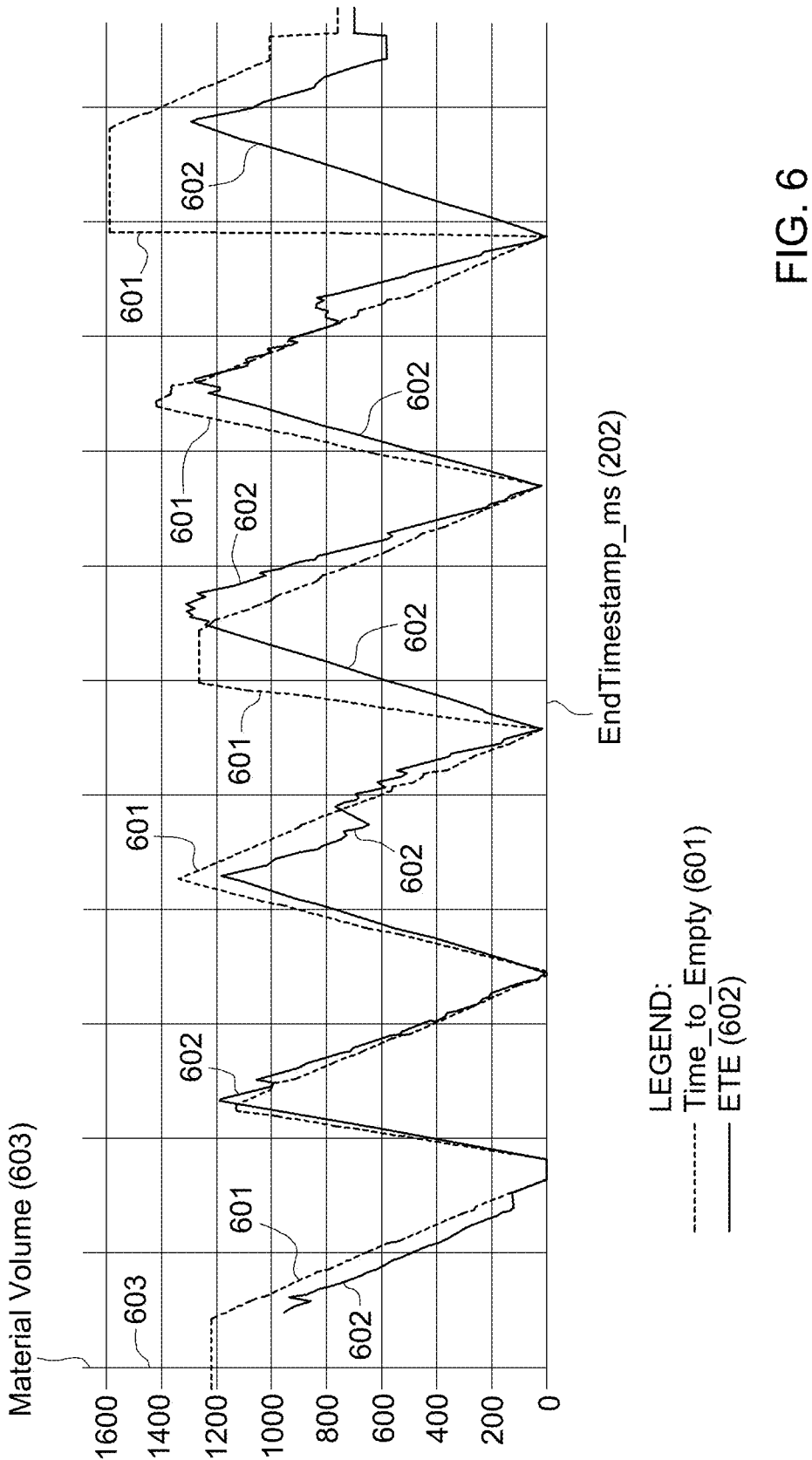
FIG. 6 illustrates a first magnitude of a first material volume indicator (e.g., first signal) versus time that is indicative of an estimated time period until empty of the volume of a material in tank of a given volume, and a second magnitude of a second material volume indicator (e.g., second signal) versus time that is indicative of an actual observed time period until empty.

FIG. 6 illustrates a first magnitude of a first signal 602 versus time 202 that is indicative of an estimated time period until empty (ETE) of the volume of a material in tank 15 of a given volume, and a second magnitude of a second signal 601 (e.g., reference signal based on verified observations of sensor data by sensors 18) versus time 202 (on the horizontal axis) that is indicative of an actual observed time period until empty (e.g., Time to Empty). The second signal 601 is illustrated as a dashed line in FIG. 6. The vertical axis 603 represents a level of material in the tank 15 for a number of successive depletion and fill cycles.

Figure 7:
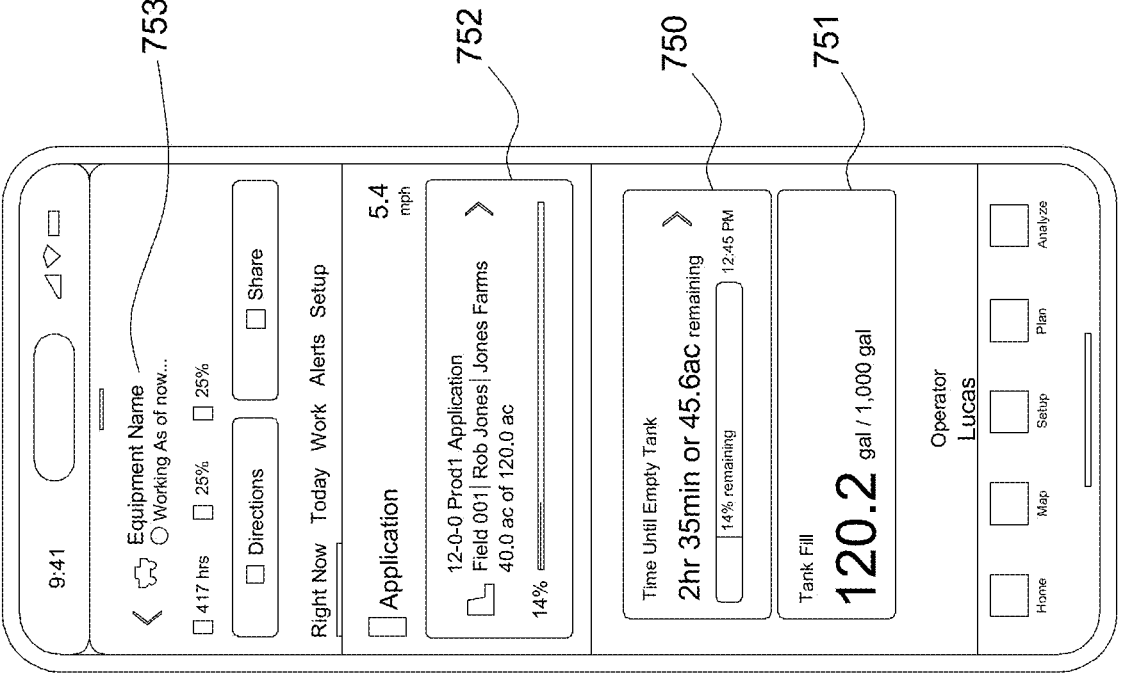
FIG. 7 illustrates a graphical user interface for a software application that provides an estimated time period until empty for the volume of material in a tank of a given volume in accordance with the disclosure.

FIG. 7 illustrates a graphical user interface (e.g., 67) for a software application or software modules 25 that provides an estimated time period until empty for the volume of material in a tank of a given volume in accordance with the disclosure. The graphical user interface may display one or more of the following items: an equipment name 753 or nickname (e.g., for the machine or off-road vehicle) that is entered or selected by an operator; a field identifier or work site identifier 752 in which the machine or off-road vehicle operates; a graphical representation of time until empty 750, such as a bar chart indicative of the time until empty, alone or together with a numerical representation in time units (e.g., hours and minutes); and a current (volumetric) estimate 751 of the volume of material in the tank, alone or together with a numerical representation of in volumetric units.

Although certain embodiments of receivers, systems, methods, processes and examples have been described in this disclosure, the scope of the coverage of this disclosure may extend to variants of the receiver, systems, methods, processes, examples, systems and concepts disclosed herein. For example, in any patent that may be granted on this disclosure, one or more claims can cover equivalents and variants to the full extent permitted under applicable law, among other things

The invention claimed is:

1. A method for estimating a time period until empty or near empty for a material in a tank of a machine, the method comprising:

collecting input data including a consumption rate of the material, a tank capacity for the material, and an initial quantity of the material associated with operation of the machine;

determining a count of sub-operations for the machine, the sub-operations corresponding to respective different fill events for the tank;

when the count is less than a threshold, estimating a first depletion time until empty or near empty for the material in the tank based on a first equation set corresponding to a first sub-operation, wherein near empty is defined as less than a threshold minimum level for the material in the tank;

when the count is greater than or equal to the threshold, estimating a second depletion time until empty or near empty based on a second equation set different from the first equation set, the second equation set corresponding to one or more second sub-operations after the first sub-operation; and displaying, via an electronic display in communication with an electronic data processor of the machine, at least one of the first depletion time or the second depletion time to an end user of the machine.

2. The method according to claim 1, further including determining the first depletion time based on at least one of an observed initial depletion estimate for a respective current or live observation time corresponding to a historical period; a historical estimate of the first depletion time for the historical period; a material type corresponding to the first sub-operation, and an initial consumption rate corresponding to the first sub-operation.

3. The method according to claim 1, wherein the first equation set is configured to overweigh an initial depletion estimate determined based on: an observed initial depletion estimate for a current or live observation time corresponding to a historical period; a historical estimate of the first depletion time for the historical period, and a highest ranking available hierarchical factor in a hierarchical succession order.

4. The method according to claim 3, wherein the highest ranking available hierarchical factor includes an applied material type and an initially applied material type, the machine includes a sprayer, and the material includes at least one of: a solution, a mixture, a compound, water, nutrients, a fungicide, a pesticide, an insecticide, a herbicide, a biocide, a chemical, or a solvent.

5. The method according to claim 3, wherein the highest ranking available hierarchical factor includes an applied material type and an initially applied material type, the machine includes a planter, and the material includes at least one of a seed or a plant.

6. The method according to claim 1, wherein the consumption rate represents a respective set of samples accumulated over a sampling interval, and the samples represent an aggregate slope of a predicted decrease in volume of the material in the tank per unit time.

7. The method according to claim 1, wherein the consumption rate is based on a machine identifier and one or more available hierarchical factors in hierarchical succession order as follows: (a) a field identifier or work area identifier for a field or work area in which the machine operates, (b) an organization identifier for an organization that owns, leases or operates the machine, and (c) material identifier of the material.

8. The method according to claim 1, wherein the initial first equation set includes:

$$ETEt =$$

$$\left(\text{weight}_1^2 * \text{Initial estimate}_t\right) + \left(\text{weight}_2 * \text{Live sub-operational estimate}_t\right),$$

where:

ETEt is the first depletion time until empty or near empty;

weight$_1$ is a first weight of a first cellular node of a machine learning model;

Initial estimate$_t$ is an estimated depletion time until empty or near empty of the material in the tank corresponding to the first sub-operation;

weight$_2$ is a second weight of a second cellular node of the machine learning model; and Live sub-operational estimate$_t$ is a first observed initial depletion estimate, the first observed initial depletion estimate corresponding to a respective sub-operational period; and $$\text{Initial estimate}_t =$$

$$MLmodel(\text{Live } \underline{\text{operational}} \text{ estimate}_t, HistoricalEstimate_t,$$

$$Materialtype, InitialConsumptionrate, OptionalModeledFactor),$$

where:

MLmodel represents the machine learning model;

Live operational estimate$_t$ is a second observed initial depletion estimate, the second observed initial depletion estimate corresponding to a current or live observation time, the current or live observation time corresponding to a series of sub-operational periods from a first sub-operational period to a current sub-operational period;

HistoricalEstimate$_t$ is a historical estimate of an initial depletion time for a historical period;

Materialtype is a material type of the material;

InitialConsumptionrate includes an initial consumption rate for the material; and OptionalModeledFactor is an optional factor that is available.

9. The method according to claim 8, wherein the machine learning model includes at least one of a gradient boosted tree decision network model, a linear regression model, a decision list network, or a deep learning network.

10. The method according to claim 8, wherein the machine learning model includes a network of cellular nodes, wherein an input layer including multiple ones of the cellular nodes is configured to communicate or to propagate an output including the estimated depletion time until empty or near empty.

11. The method according to claim 1, wherein the displaying includes:

displaying an estimated remaining coverage area prior to reaching the at least one of the first depletion time or the second depletion time; and generating an alert message when an observed depletion time is equal to or less than a minimum threshold depletion time.

12. The method according to claim 1, wherein the at least one of the first depletion time or the second depletion time includes an estimated time until a fuel tank of the machine is empty, further including controlling or reducing a fuel consumption rate to extend the estimated time.

13. The method according to claim 1, further including:

detecting a fill event that adds additional material to existing or remaining material in the tank, wherein the detecting the fill event includes detecting an increase or continuous increase in observed volume of the material in the tank for a threshold number of sample sets and by a threshold increase in volume;

incrementing the count of the sub-operations;

estimating an amount or magnitude of the additional material to be added to the tank; and determining an updated initial fill level of the tank based on the existing or remaining material and the additional material.

14. The method according to claim 13, further including a historical consumption rate in the input data detecting the fill event.

15. The method according to claim 14, further including determining the historical consumption rate based on a machine model of the machine, a machine identifier of the machine, an organization identifier of an organization that owns, leases or operates the machine, equipment hours, a field identifier or worksite identifier, a date or season, an ambient temperature, a fuel type, a geographic region in which the machine is operated, and a crop type or operation task identifier.

16. The method according to claim 1, wherein the second equation set includes:

$$EtE_t = (\text{weight}_1 * \text{Live operational estimate}_t) + (\text{weight}_2 * \text{Live sub-}$$

$$\text{operational estimate}_t),$$

where:

ETE$_t$ is the second depletion time until empty or near empty;

weight$_1$ is a first weight of a first cellular node of a machine learning model, where:

$$\text{weight}_1 = \frac{\text{Tank Volume}}{\text{Observed Max Tank Volume}};$$

$$\text{Live operational estimate}_t = \frac{\text{Tank Volume}}{\text{Quantity}_{op} \text{Duration}_{op}},$$

where:

Tank Volume is a volume of the tank;

Quantity$_{op}$ is a first quantity of the material in the tank based on a continuous series of sub-operational periods from a first sub-operational period to a current sub-operational period;

$\mathrm{Duration}_{op}$ is a first duration of the sub-operational periods;

Live operational estimate$_t$ is a first observed initial depletion estimate, the first observed initial depletion estimate corresponding to a current or live observation time, the current or live observation time corresponding to the sub-operational periods;

$$weight_2 = 1 - weight_1,$$

where:

$weight_2$ is a second weight of a second cellular node of the machine learning model; and $$\text{Live suboperational estimate}_t = \frac{\text{Tank Volume}}{\text{Quantity}_{sop}\text{Duration}_{sop}}$$

and where:

$\mathrm{Quantity}_{sop}$ is a second quantity of the material in the tank for the current sub-operational period;

$\mathrm{Duration}_{sop}$ is a second duration of the current sub-operational period; and Live sub-operational estimate$_t$ is a second observed initial depletion estimate corresponding to a respective sub-operational period.

17. A system comprising:

memory;

instructions in the memory; and an electronic data processor to execute the instructions to:

collect input data including a consumption rate of material in a tank of a machine, a tank capacity for the material, and an initial quantity of the material associated with operation of the machine;

determine a count of sub-operations for the machine, the sub-operations corresponding to respective different fill events for the tank;

when the count is less than a threshold, estimate a first depletion time until empty or near empty for the material in the tank based on a first equation set corresponding to a first sub-operation, wherein near empty is defined as less than a threshold minimum level for the material in the tank;

when the count is greater than or equal to the threshold, estimate a second depletion time until empty or near empty based on a second equation set different from the first equation set, the second equation set corresponding to one or more second sub-operations after the first sub-operation; and cause an electronic display to display at least one of the first depletion time or the second depletion time to an end user of the machine.

* * * * *